US012625042B2

(12) United States Patent
Kanazawa et al.

(10) Patent No.: US 12,625,042 B2
(45) Date of Patent: May 12, 2026

(54) METHOD FOR CHECKING QUALITY OF HEAT EXCHANGER

(71) Applicant: Kobe Steel, Ltd., Hyogo (JP)

(72) Inventors: Hiroaki Kanazawa, Takasago (JP);
Kentaro Tanaka, Takasago (JP);
Hideki Takafuji, Takasago (JP);
Tadashi Ikeuchi, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 358 days.

(21) Appl. No.: 18/354,716

(22) Filed: Jul. 19, 2023

(65) Prior Publication Data

US 2024/0044759 A1     Feb. 8, 2024

(30) Foreign Application Priority Data

Aug. 8, 2022     (JP) ................................. 2022-126609

(51) Int. Cl.
*G01N 3/12* (2006.01)
*F28F 27/00* (2006.01)
(52) U.S. Cl.
CPC .............. *G01N 3/12* (2013.01); *F28F 27/00* (2013.01); *F28F 2200/00* (2013.01)
(58) Field of Classification Search
CPC .......... G01M 3/10; G01M 3/106; G01M 3/14; G01M 3/146; G01M 3/148; G01M 3/18; G01M 3/186; G01M 3/188; G01M 3/22; G01M 3/226; G01M 3/228; G01M 3/32; G01M 3/3227
See application file for complete search history.

(56) References Cited

U.S. PATENT DOCUMENTS

| | | | | |
|---|---|---|---|---|
| 6,367,311 B1 * | 4/2002 | Garg | ........................ | H02K 9/24 |
| | | | | 73/40 |
| 7,886,580 B2 * | 2/2011 | Kumar | ................ | G01M 3/3227 |
| | | | | 73/40.7 |
| 10,458,879 B2 * | 10/2019 | Bowling | ............. | G01M 3/2815 |
| 2009/0145200 A1 | 6/2009 | Kumar et al. | | |
| 2011/0000284 A1 | 1/2011 | Kumar et al. | | |

FOREIGN PATENT DOCUMENTS

| | | |
|---|---|---|
| JP | S61-118643 A | 6/1986 |
| WO | 2009/073840 A1 | 6/2009 |

OTHER PUBLICATIONS

The extended European search report issued by the European Patent Office on Dec. 14, 2023, which corresponds to European Patent Application No. 23186675.7-1001 and is related to U.S. Appl. No. 18/354,716.

* cited by examiner

*Primary Examiner* — Erika J. Villaluna
(74) *Attorney, Agent, or Firm* — Studebaker Brackett PLLC

(57) ABSTRACT
A method for checking quality of a heat exchanger includes the steps of: performing a liquid pressure test for the heat exchanger including a first flow path and a second flow path adjacent to the first flow path by filling the first flow path and the second flow path with a liquid in a pressurized state; discharging the liquid from the first flow path and the second flow path; and promoting evaporation of the liquid remaining in the first flow path and the second flow path by reducing pressure inside each of the first flow path and the second flow path using a vacuum pump. The step of promoting evaporation of the liquid is performed to feed heated gas into the first flow path and the second flow path.

6 Claims, 6 Drawing Sheets

FIG.4

VACUUM GAUGE —41

HOT AIR

43

12

13

34
21
33
21
33

34

10

45

14

11

40

VACUUM PUMP —37

VACUUM GAUGE —38

VACUUM GAUGE — 38

VACUUM PUMP — 37

40

12

13

34

21

33

21

33

34

10

45

14

11

VACUUM GAUGE — 41

43

HOT AIR

METHOD FOR CHECKING QUALITY OF HEAT EXCHANGER

FIELD OF INVENTION

The present invention relates to a method for checking quality of a heat exchanger.

BACKGROUND ART

As disclosed in JP S61-118643 A, performing a pressure resistance test of a heat exchanger after assembling the heat exchanger has been conventionally known. In JP S61-118643 A, a pressure resistance test after completion of assembly of a heat exchanger is performed by filling the heat exchanger with an aqueous solution (aqueous solution of ammonium carbonate and ammonium hydrogen carbonate) under a pressure of 45 kg/cm², for example, to pressurize the inside of the heat exchanger. Performing the pressure resistance test enables quality of the heat exchanger to be checked. After the pressure resistance test, processing of blowing hot air at 230° C. with an air volume of 14 m³/min into the heat exchanger is also performed to dry the inside of the heat exchanger.

The method disclosed in JP S61-118643 A uses hot air at 230° C. to perform hot air drying, and it takes four to five hours to complete the drying. This method requires a large amount of hot air to complete a quality check, so that cost for performing the quality check increases.

SUMMARY OF THE INVENTION

An object of the present invention is to provide a method for checking quality of a heat exchanger that does not need to use a large amount of hot air.

A method for checking quality of a heat exchanger according to an aspect of the present invention includes the steps of: performing a liquid pressure test for the heat exchanger including a first flow path and a second flow path adjacent to the first flow path by filling the first flow path and the second flow path with a liquid in a pressurized state; discharging the liquid from the first flow path and the second flow path; and promoting evaporation of the liquid remaining in the first flow path and the second flow path by reducing pressure inside each of the first flow path and the second flow path using a vacuum pump.

BRIEF DESCRIPTION OF THE DRAWINGS

FIG. 4 is a diagram illustrating a heat exchanger when a first step is performed in the method for checking quality;

DETAILED DESCRIPTION

Embodiments of the present invention will hereinafter be described in detail with reference to the drawings.

Figure 1:
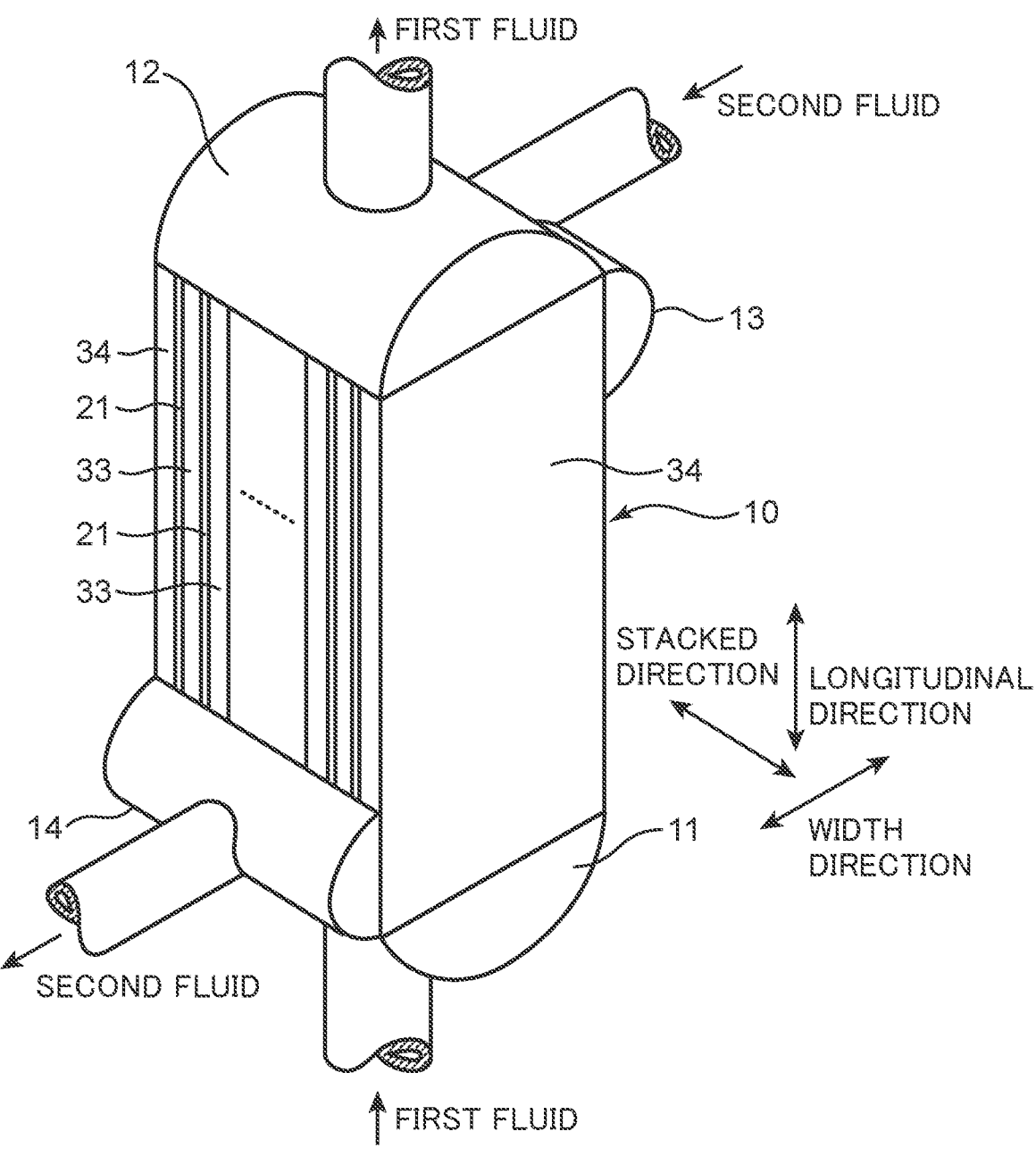
FIG. 1 is a perspective view of a heat exchanger of a stacked type to be checked using a method for checking quality.
Figure 2:
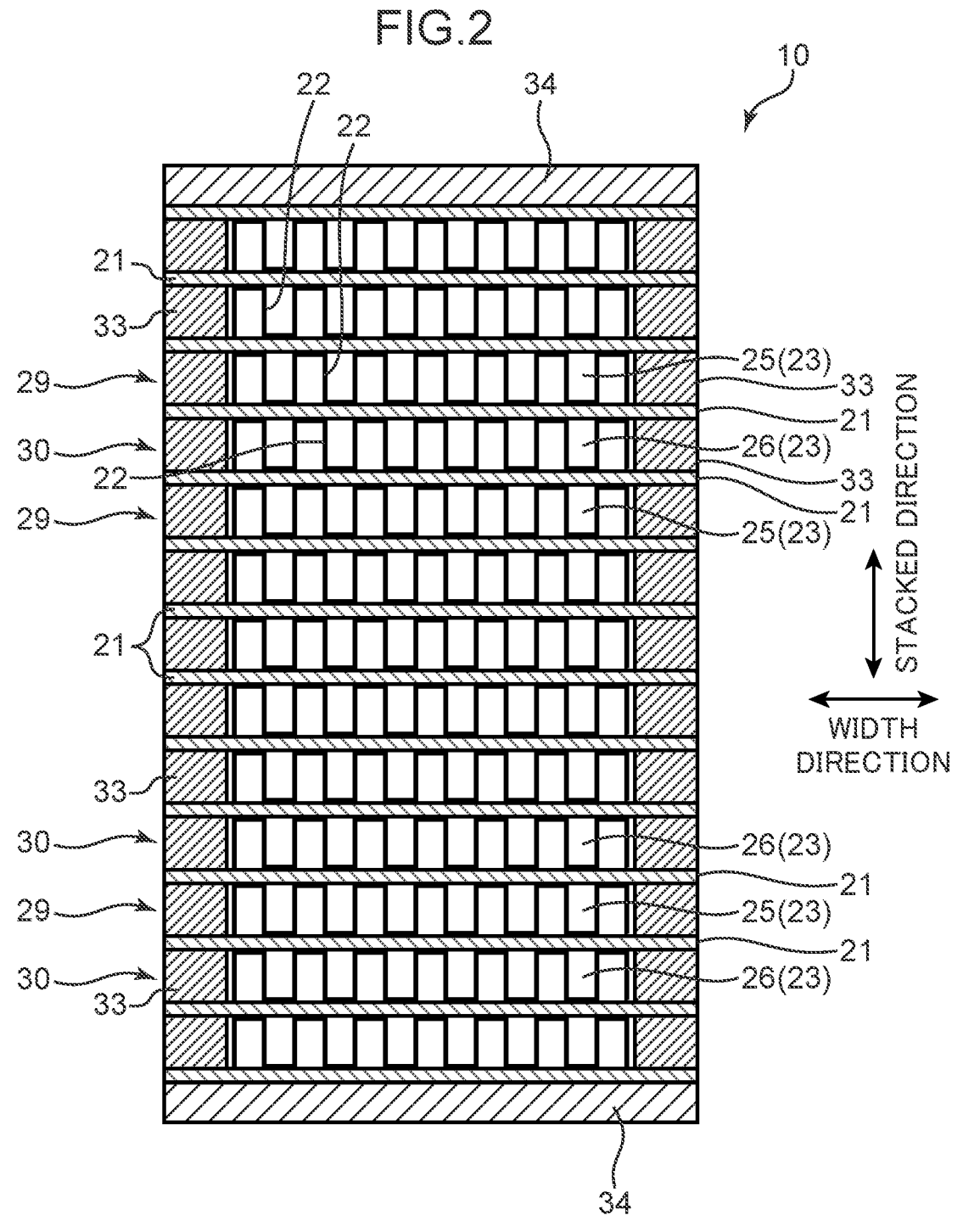
FIG. 2 is a diagram for describing a flow path structure of the heat exchanger.

A method for checking quality according to the present embodiment is for a heat exchanger 10 of a stacked type illustrated in FIGS. 1 and 2. The method for checking quality is performed after manufacturing the heat exchanger 10 and before shipping the heat exchanger 10 to a customer. Before the method for checking quality is specifically described, a configuration of the heat exchanger 10 will be first described. The heat exchanger 10 to be checked for quality is not limited to the heat exchanger 10 illustrated in FIGS. 1 and 2 as long as it is a heat exchanger of a stacked type, and may be, for example, a plate heat exchanger including many stacked plates and a gap between the corresponding plates formed as a flow path. Alternatively, the heat exchanger 10 may be a microchannel heat exchanger configured such that many plates having surfaces provided with many grooves are stacked each other to form many flow paths between corresponding plates adjacent to each other by bonding the corresponding plates to each other. The heat exchanger 10 may be made of an aluminum material, or may be made of stainless steel, titanium, or the like.

The heat exchanger 10 illustrated in FIGS. 1 and 2 is a plate fin heat exchanger configured to perform heat exchange between a first fluid and a second fluid. The heat exchanger 10 is provided with headers 11 and 12 for the first fluid, and headers 13 and 14 for the second fluid, which are attached. The headers 11 and 12 for the first fluid include a first distribution header 11 through which the first fluid passes before flowing into the heat exchanger 10, and a first collection header 12 through which the first fluid having flowed out of the heat exchanger 10 passes. Then, the headers 13 and 14 for the second fluid include a second distribution header 13 through which the second fluid passes before flowing into the heat exchanger 10, and a second collection header 14 through which the second fluid having flowed out of the heat exchanger 10 passes.

The heat exchanger 10 includes many partition plates 21 each formed of a flat plate, and fin plates 22 that are each in a corrugated shape and disposed between the corresponding partition plates 21 adjacent to each other. The many partition plates 21 are disposed at intervals in one direction (a thickness direction of the partition plate 21, and is also referred to below as a stacked direction), and the fin plates 22 are disposed between the corresponding partition plates 21.

Each fin plate 22 is bonded to the partition plates 21 paired and located on opposite sides thereof. As a result, many flow paths 23 are formed between the corresponding partition plates 21. The corresponding partition plates 21 are each also connected on its opposite side to another fin plate 22, so that many flow paths 23 are formed on opposite sides of the corresponding partition plates 21. The flow path 23 located on one side of the partition plate 21 functions as one of many first flow paths 25 through which the first fluid flows, and the flow path 23 located on the other side of the partition plate 21 functions as one of many second flow paths 26 through which the second fluid flows. That is, the first flow path 25 and the second flow path 26 are adjacent to each other with the partition plate 21 interposed therebetween.

The many first flow paths 25 (a first flow path group) are disposed side by side in a width direction of the partition plate 21 (an oblique direction in FIG. 1 and a left-right direction in FIG. 2), and each of the first flow paths 25 extends in a longitudinal direction of the partition plate 21 (a vertical direction in FIG. 1 and a depth direction in FIG. 2). The many second flow paths 26 (a second flow path group) are also disposed side by side in the width direction of the partition plate 21 (the oblique direction in FIG. 1 and the left-right direction in FIG. 2), and each of the second flow paths 26 extends in the longitudinal direction of the partition plate 21 (the vertical direction in FIG. 1 and the depth direction in FIG. 2). Then, a first layer 29 having the many first flow paths 25 (the first flow path group) and a second layer 30 having the many second flow paths 26 (the second flow path group) are alternately disposed and stacked in a stacked direction (the oblique direction in FIG. 1 and the vertical direction in FIG. 2). Thus, the many first flow paths 25 and second flow paths 26 are disposed in the stacked direction.

Each of the first flow paths 25 communicates with an inner space of the first distribution header 11 and an inner space of the first collection header 12. Thus, the first fluid introduced into the first distribution header 11 flows into each of the first flow paths 25, and the first fluid having flowed through each of the first flow paths 25 is merged into the first collection header 12. Each of the second flow paths 26 communicates with an inner space of the second distribution header 13 and an inner space of the second collection header 14. Thus, the second fluid introduced into the second distribution header 13 flows into each of the second flow paths 26, and the second fluid having flowed through each of the second flow paths 26 is merged into the second collection header 14.

Each of the first layers 29 and each of the second layers 30 are provided with side bars 33 on opposite sides in the width direction of the partition plate 21. The side bars 33 close opposite ends of the fin plate 22 in the width direction between the corresponding partition plates 21 paired. Even when pressure in the first flow path 25 and the second flow path 26 acts on the fin plate 22, providing the side bars 33 enables withstanding the pressure.

The heat exchanger 10 has opposite ends in the stacked direction that are each provided with an outer plate 34. The outer plate 34 is formed of a flat plate having a thickness larger than that of the partition plate 21. Thus, even when pressure in the first flow path 25 and the second flow path 26 acts on the partition plate 21, providing the outer plate 34 enables withstanding the pressure.

Although the heat exchanger 10 in FIG. 1 is provided with only the first flow path 25 and the second flow path 26, the present embodiment is not limited thereto. For example, the heat exchanger 10 may include a third flow path (not illustrated) in addition to the first flow path 25 and the second flow path 26 to perform heat exchange among the first fluid, the second fluid, and a third fluid. For example, this configuration may include many second flow paths 26 through which the second fluid flows that are adjacent to corresponding many first flow paths 25 through which the first fluid flows, and many third flow paths through which the third fluid flows that are adjacent to the corresponding many second flow paths 26.

Figure 3:
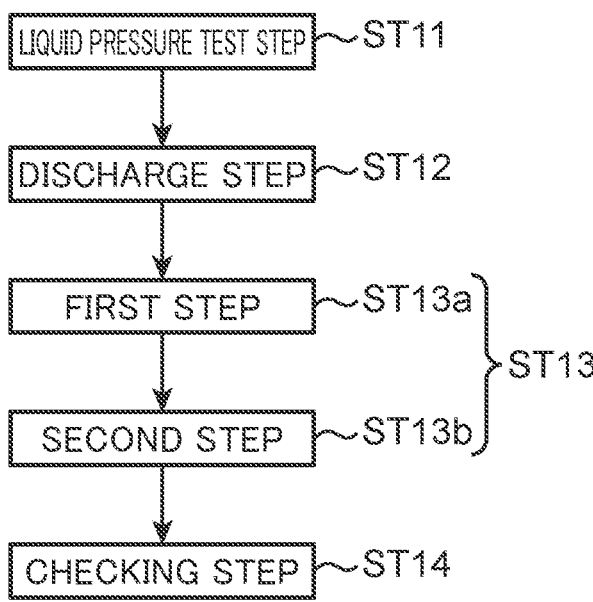
FIG. 3 is a diagram for describing each step of the method for checking quality.

Next, a method for checking quality of the heat exchanger 10 performed after the heat exchanger 10 is assembled will be described with reference to FIG. 3. The method for checking quality of the heat exchanger 10 first allows a liquid pressure test to be performed (liquid pressure test step ST11). The liquid pressure test is performed to fill the first flow path 25 and the second flow path 26 with a liquid and hold the inside of each of the flow paths 25 and 26 in a pressurized state. Thus, one of the first distribution header 11 and the first collection header 12 communicating with the first flow path 25 is closed by a plug member (not illustrated), and the other connected to a pipe (not illustrated). Through the pipe, a liquid (e.g., water) is introduced into the first flow path 25. At this time, the liquid is sealed in the first flow path 25 so that the first flow path 25 is filled with the liquid under pressure higher than the pressure defined in the required specifications of the heat exchanger 10. This pressure is at least higher than atmospheric pressure.

Then, this state is held for a predetermined time. At this time, the second flow path 26 may be opened to the atmosphere, or the second flow path 26 may be closed. When a predetermined time elapses, the plug member is removed, and the liquid in the first flow path 25 is discharged (discharge step ST12).

Subsequently, a liquid pressure test for filling the second flow path 26 with a liquid is also performed in the same manner as the liquid pressure test for the first flow path 25 (liquid pressure test step ST11). Then, when a predetermined time elapses, the liquid in the second flow path 26 is discharged (discharge step ST12). The liquid pressure test may be performed first for any one of the first flow path 25 and the second flow path 26.

Next, an evaporation promotion step ST13 for evaporating the liquid remaining in the first flow path 25 and the second flow path 26 is performed. The evaporation promotion step ST13 is a step of promoting evaporation of the liquid remaining in the flow paths 25 and 26 by pressure-reducing and heating the inside of each of the flow paths 25 and 26. The evaporation promotion step ST13 includes a first step ST13a of reducing pressure inside the first flow path 25 without reducing pressure inside the second flow path 26, and a second step ST13b of reducing pressure inside the second flow path 26 without reducing pressure inside the first flow path 25. Although the second step ST13b is here performed after the first step ST13a, the second step ST13b may be performed before the first step ST13a.

Figure 4:
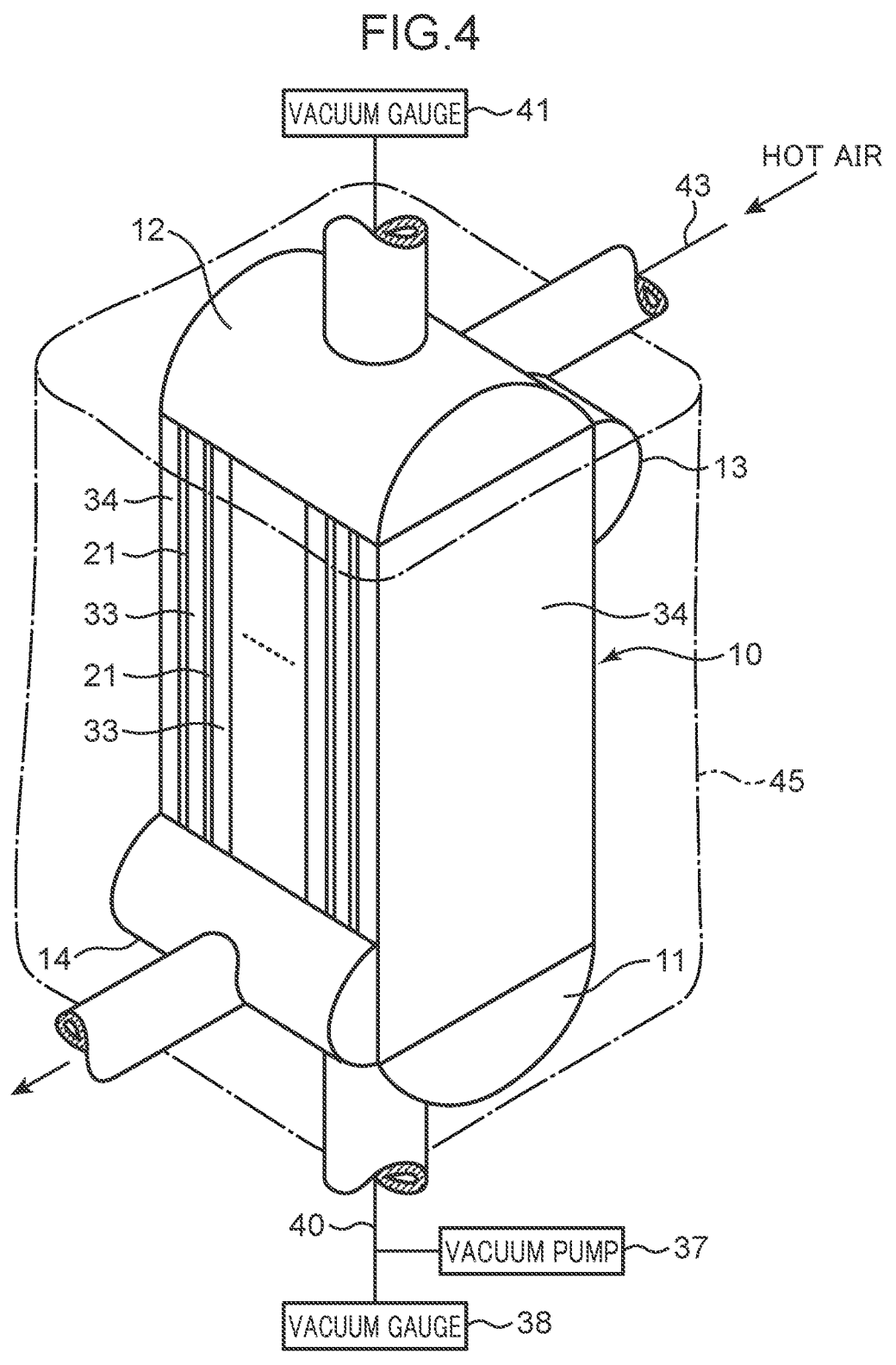

As illustrated in FIG. 4, the first step ST13a is performed by connecting a suction pipe provided with a vacuum pump 37 and a vacuum gauge 38 to one of the first distribution header 11 and the first collection header 12 and connecting a vacuum gauge 41 to the other to enable the first flow path 25 to be decompressed. Then, a heating pipe 43 for feeding heated gas (hot air) is connected to one of the second distribution header 13 and the second collection header 14, and the other is opened.

The first step ST13a is then performed to operate the vacuum pump 37 to reduce pressure inside the first flow path 25, and feed heated gas to the second flow path 26 through the heating pipe 43. The first step ST13a is also performed to heat the heat exchanger 10 itself. That is, the heat exchanger 10 is covered with a cover 45 made of a heat insulating material, and the heated gas (hot air) is fed into an inner space of the cover 45. The gas (hot air) to be fed may have a temperature of 100° C. or higher, or may have a temperature of 100° C. or lower. The cover 45 may not be made of a heat insulating material.

The first step ST13a is performed to operate the vacuum pump 37 until a degree of vacuum reaches a predetermined value by checking the degree of vacuum in the first flow path 25 with the vacuum gauges 38 and 41. That is, the first step ST13a is ended on condition that a decrease in pressure to a predetermined pressure or less in the first flow path 25 has been detected. As long as a liquid remains in the first flow path 25 and the liquid continues to evaporate, the pressure in the first flow path 25 does not decrease to the predetermined pressure or less. Thus, continuous operation of the vacuum pump 37 until the pressure in the first flow path 25 decreases to the predetermined pressure or less enables eliminating a state in which the liquid remains in the first flow path 25. At this time, the inside of the second flow path 26 is heated and the heat exchanger 10 itself is also increased in temperature, so that the inside of the first flow path 25 is also increased in temperature. Thus, the evaporation of the liquid in the first flow path 25 is promoted by not only decompressing the inside of the first flow path 25 but also heating the inside thereof. The inside of the first flow path 25 is decompressed, so that gas flowing out of the first flow path 25 may have a temperature equal to or lower than a boiling point of a liquid to be used under the atmospheric pressure. For example, when a liquid used in the liquid pressure test is water, gas flowing out of the first flow path 25 may have a temperature of 100° C. or lower.

Figure 5:
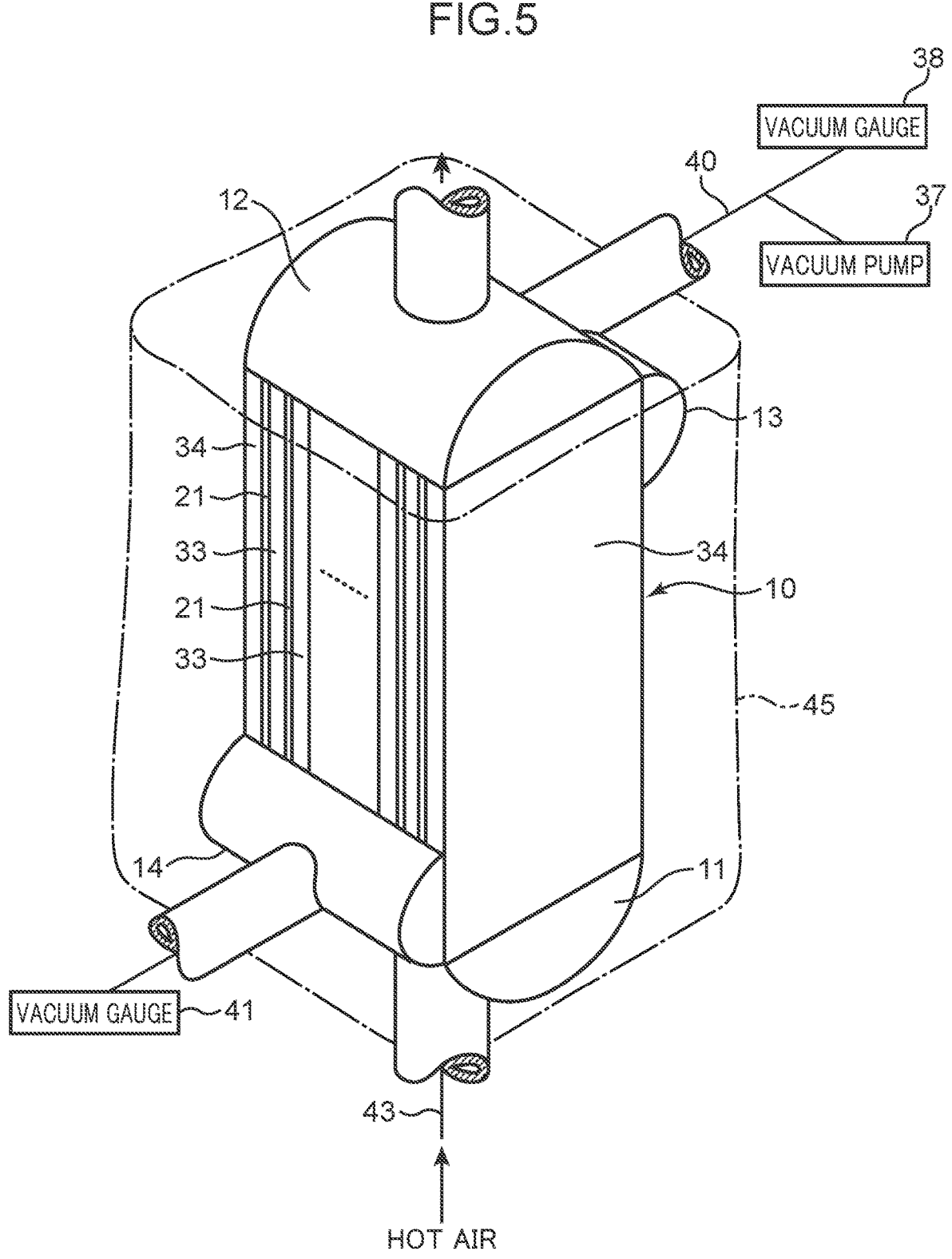
FIG. 5 is a diagram illustrating a heat exchanger when a second step is performed in the method for checking quality.

When the first step ST13a is ended, processing proceeds to the second step ST13b. As illustrated in FIG. 5, the second step ST13b is performed to reconnect the suction pipe 40 to one of the second distribution header 13 and the second collection header 14 from one of the first distribution header 11 and the first collection header 12, and remove the vacuum gauge 41 connected to the other of the first distribution header 11 and the first collection header 12 and attach the vacuum gauge 41 to the other of the second distribution header 13 and the second collection header 14. Then, the heating pipe 43 attached to one of the second distribution header 13 and the second collection header 14 is removed, and the heating pipe 43 is then connected to one of the first distribution header 11 and the first collection header 12. The cover 45 is maintained in a state of covering the heat exchanger 10.

The second step ST13b is then performed to operate the vacuum pump 37 to reduce pressure inside the second flow path 26, and feed the heated gas to the first flow path 25 through the heating pipe 43. The second step ST13b is also performed to heat the heat exchanger 10 itself. As a result, the evaporation of the liquid in the second flow path 26 is promoted by not only decompressing the inside of the second flow path 26 but also heating the inside thereof.

A degree of vacuum in the second flow path 26 is checked with the vacuum gauges 38 and 41 in the second step ST13b. The second step ST13b is ended on condition that a decrease in pressure to a predetermined pressure or less in the second flow path 26 has been detected with the vacuum gauges 38 and 41.

Next, no liquid remaining in the first flow path 25 and the second flow path 26 is checked (checking step ST14). Specifically, each of the first flow path 25 and the second flow path 26 is filled with a gas with a dew point that is known and lower than a required dew point, and then this state is held for a predetermined time. Available examples of the gas with a known dew point include nitrogen gas, helium gas, argon gas, dry air, and the like. Although a gas other than the above gas may be used, this case requires a dew point of the gas to be measured with a dew point meter before the heat exchanger 10 is filled with the gas.

After a predetermined time has elapsed, the enclosed gas is caused to flow out from the first flow path 25, and a dew point of the gas flowing out is measured with a dew point meter. Similarly, a dew point of the gas filled in the second flow path 26 is measured.

When the dew point is equal to or less than a predetermined value (required dew point), no moisture remains in the first flow path 25 and the second flow path 26, and thus a quality check is ended. When the dew point exceeds the predetermined value, the evaporation promotion step ST13 is performed again.

As described above, in the method for checking quality according to the present embodiment, since the liquid pressure test is performed by filling the first flow path 25 and the second flow path 26 with a liquid in a pressurized state, and thus enabling checking whether the liquid leaks from the heat exchanger 10. After the liquid used in the liquid pressure test is discharged from the heat exchanger 10, the inside of each of the flow paths 25 and 26 is decompressed to promote evaporation of the liquid remaining in the flow paths 25 and 26. This processing enables preventing an adverse effect caused by the liquid remaining in the heat exchanger 10 from occurring. Additionally, evaporation of the residual liquid is promoted by reducing pressure inside each of the flow paths 25 and 26, and thus enabling reduction in energy required to dry the inside of the heat exchanger 10 as compared with when the inside of the heat exchanger 10 is dried by blowing hot air into the heat exchanger 10 under the atmospheric pressure. Thus, an increase in cost for performing a quality check of the heat exchanger 10 can be suppressed.

The method for checking quality causes the first flow path 25 and the second flow path 26 to be separately decompressed. The first step ST13a in which the inside of the first flow path is decompressed causes the inside of the second flow path 26 to be heated, so that the first flow path 25 is also increased in temperature with the heating of the inside of the second flow path 26. That is, when the inside of the second flow path 26 is heated, the heat of the second flow path 26 is transferred to the first flow path 25, and thus the inside of the first flow path 25 is not only decompressed but also increased in temperature. Thus, the evaporation of the residual liquid can be promoted while a degree of decompression in the first flow path 25 is suppressed. That is, even when a degree of vacuum in the first flow path 25 is not increased so high (i.e., even when pressure is not reduced so much), the liquid can be evaporated. Thus, pump power required for the evaporation promotion step ST13 can be reduced. The second step ST13b also similarly enables promoting the evaporation of the liquid remaining in the second flow path 26. That is, the liquid is evaporated by heating the inside of each of the flow paths 25 and 26 while reducing pressure inside the flow paths 25 and 26, so that temperature of gas to be fed into the flow paths and 26 can be suppressed to be low as compared with a method for heating and evaporating a liquid without reducing pressure inside each of the flow paths 25 and 26. Thus, even when the heat exchanger 10 is made of an aluminum material, for example, material deterioration can be prevented.

Additionally, pressure enabling substantially no liquid to remain in the flow paths 25 and 26 is, for example, set as predetermined pressure set as a condition for ending the first step ST13a and the second step ST13b. When the pressure in the flow paths 25 and 26 reaches the set pressure, the first step ST13a and the second step ST13b are ended, and thus enabling obtaining a state in which substantially no liquid remains in the flow paths 25 and 26 of the heat exchanger 10.

The checking step ST14 is further performed, so that a user of the heat exchanger 10 can be guaranteed that no liquid remains in the first flow path 25 and the second flow path 26.

Although the present embodiment causes the evaporation promotion step ST13 to be performed to feed hot air to the first flow path 25 and the second flow path 26 to heat the flow paths 25 and 26, the first flow path 25 and the second flow path 26 may not be heated. In this case, the first flow path 25 and the second flow path 26 may be simultaneously decompressed without being separately decompressed in the first step ST13a and the second step ST13b.

The evaporation promotion step ST13 in the present embodiment is performed to not only feed heated gas into the first flow path 25 and the second flow path 26, but also heat the heat exchanger 10 itself. Alternatively, the heat exchanger 10 itself may not be heated in the evaporation promotion step ST13.

Additionally, the checking step ST14 can be eliminated. In this case, the first step ST13*a* and the second step ST13*b* may be performed to check whether no liquid remains by checking whether a degree of vacuum decreases to a predetermined value or less.

Instead of the checking step ST14, a step may be performed in which a gas having a dew point lower than the required dew point is continuously flew in the first flow path 25 and the second flow path 26 for a predetermined time or more. That is, a state in which the dew point is sufficiently lowered may be secured without positively measuring the dew point.

Other Embodiments

Figure 6:
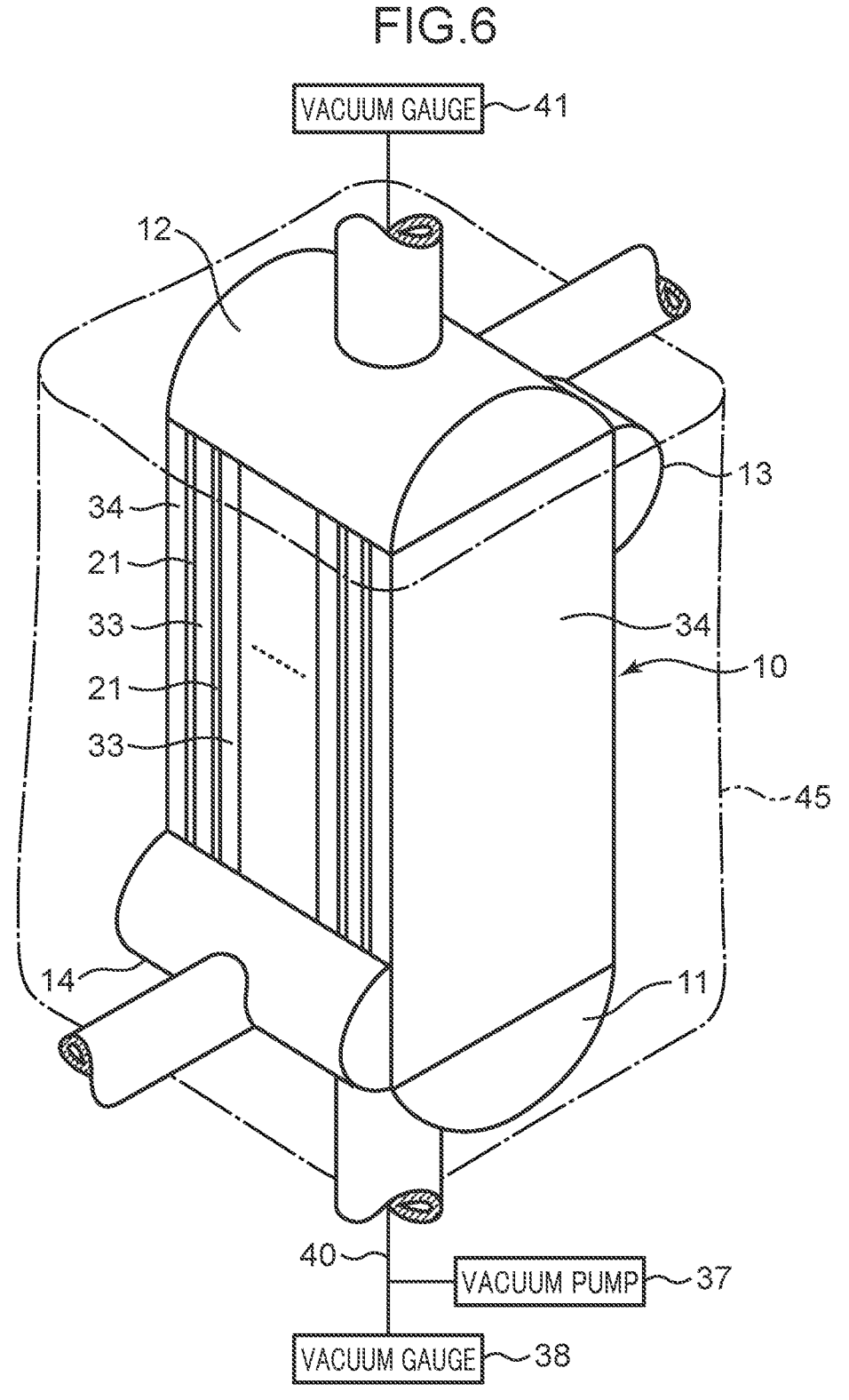
FIG. 6 is a diagram illustrating a heat exchanger when a first step is performed in a method for checking quality according to another embodiment.

It should be understood that the embodiment disclosed herein are illustrative in all respects and are not restrictive. The present invention is not limited to the above embodiment, and various modifications, improvements, and the like can be made without departing from the gist of the present invention. For example, although the evaporation promotion step ST13 in the method for checking quality of the above embodiment is performed to not only heat the heat exchanger 10 itself, but also feed heated gas to the first flow path 25 and the second flow path 26, the present embodiment is not limited thereto. That is, the evaporation promotion step ST13 may be performed to feed no heated gas to the first flow path 25 and the second flow path 26 while the heat exchanger 10 itself is heated. For example, the evaporation promotion step ST13 is performed by covering the heat exchanger 10 with the cover 45 to feed heated gas (hot air) to the inner space covered with the cover 45 to heat the heat exchanger 10, as illustrated in FIG. 6. Then, the suction pipe 40 provided with the vacuum pump 37 and the vacuum gauge 38 is connected to one of the first distribution header 11 and the first collection header 12 and the vacuum gauge 41 is connected to the other to enable the first flow path 25 to be decompressed. The vacuum pump 37 is then operated to reduce pressure inside the first flow path 25 (first step ST13*a*). The first step ST13*a* is performed to check a degree of vacuum in the first flow path 25 with the vacuum gauges 38 and 41, and when the degree of vacuum reaches a predetermined value, the first step ST13*a* is ended.

Next, the suction pipe 40 provided with the vacuum pump 37 and the vacuum gauge 38 is connected to one of the second distribution header 13 and the second collection header 14 and the vacuum gauge 41 is connected to the other to enable the second flow path 26 to be decompressed. The vacuum pump 37 is then operated to reduce pressure inside the second flow path 26 (second step ST13*b*). The second step ST13*b* is performed to check a degree of vacuum in the second flow path 26 with the vacuum gauges 38 and 41, and when the degree of vacuum reaches a predetermined value, the second step ST13*b* is ended.

This method enables suppressing a degree of decompression when the inside of the first flow path 25 and the second flow path 26 is decompressed by the vacuum pump 37. That is, when the heat exchanger 10 itself is heated, a liquid can be evaporated even when the degree of vacuum in the first flow path 25 and the second flow path 26 is not increased so high (i.e., even when pressure is not reduced so much). Thus, pump power required for the evaporation promotion step ST13 can be reduced. Although a heating source for heating the heat exchanger 10 is required, the heating source is not used for directly heating and evaporating the liquid remaining in the flow paths 25 and 26, but is used for heating the decompressed flow paths 25 and 26. Thus, this method enables suppressing an increase in temperature of the heat exchanger 10 as compared with a method for directly heating and evaporating the liquid, so that an increase in cost can be suppressed.

The suction pipe 40 illustrated in FIG. 6 may communicate not only with the first flow path 25 but also with the second flow path 26 to simultaneously perform the first step ST13*a* of decompressing the first flow path 25 and the second step ST13*b* of decompressing the second flow path 26.

Here, the embodiment will be outlined.

(1) The method for checking quality of a heat exchanger according the embodiment includes the steps of: performing a liquid pressure test for the heat exchanger including a first flow path and a second flow path adjacent to the first flow path by filling the first flow path and the second flow path with a liquid in a pressurized state; discharging the liquid from the first flow path and the second flow path; and promoting evaporation of the liquid remaining in the first flow path and the second flow path by reducing pressure inside each of the first flow path and the second flow path using a vacuum pump.

In the method for checking quality, a liquid pressure test is performed by sealing a liquid in the first flow path and the second flow path in a pressurized state. Thus, soundness of the heat exchanger can be checked by whether the heat exchanger is deformed or broken and whether liquid leakage occurs. After the liquid used in the liquid pressure test is discharged from the heat exchanger, the inside of each of the first flow path and the second flow path is decompressed to promote evaporation of the liquid remaining in the flow paths. This processing enables preventing an adverse effect caused by the liquid remaining in the heat exchanger from occurring. Additionally, evaporation of the residual liquid is promoted by reducing pressure inside each of the flow paths, and thus enabling reduction in energy required to dry the inside of the heat exchanger as compared with when the inside of the heat exchanger is dried by blowing hot air into the heat exchanger under the atmospheric pressure. Thus, an increase in cost for performing a quality check of the heat exchanger can be suppressed.

(2) The step of promoting evaporation of the liquid may include a first step of reducing pressure inside the first flow path, and a second step of reducing pressure inside the second flow path before, simultaneously with, or after the first step. In this case, the first step may be performed to feed heated gas into the second flow path, and the second step may be performed to feed heated gas into the first flow path.

This aspect causes the first flow path and the second flow path to be separately decompressed. In the first step in which the inside of the first flow path is decompressed, the inside of the second flow path is heated, so that the first flow path is also increased in temperature with the heating of the inside of the second flow path. That is, when the inside of the second flow path is heated, the heat of the second flow path is transferred to the first flow path, and thus the inside of the first flow path is not only decompressed but also increased in temperature. Thus, the evaporation of the residual liquid can be promoted while a degree of decompression in the first flow path is suppressed. That is, even when a degree of vacuum in the first flow path is not increased so high (i.e., even when pressure is not reduced so much), the liquid in the first flow path can be evaporated. Thus, pump power required for the evaporation promotion step can be reduced. The second step also similarly enables promoting the evaporation of the liquid remaining in the second flow path. That is, the liquid is evaporated by heating the inside of each of the first flow path and the second flow path while decompressing the inside thereof, so that temperature of gas to be fed into the flow paths can be suppressed to be low as compared with a method for heating and evaporating a liquid without decompressing the inside of each of the flow paths.

(3) The first step may be ended on condition that a decrease in pressure to a predetermined pressure or less in the first flow path is detected, and the second step may be ended on condition that a decrease in pressure to a predetermined pressure or less in the second flow path is detected.

This aspect sets pressure enabling substantially no liquid to remain in the flow paths, for example, as the predetermined pressure. When the pressure in the first flow path and the pressure in the second flow path each reach the set pressure, the first step and the second step are ended, and thus enabling obtaining a state in which substantially no liquid remains in the flow paths of the heat exchanger.

(4) The step of promoting evaporation of the liquid may be performed by heating the heat exchanger.

This aspect enables suppressing a degree of decompression when the inside of each of the first flow path and the second flow path is decompressed by the vacuum pump. That is, when the heat exchanger itself is heated, a liquid can be evaporated even when the degree of vacuum in the first flow path and the second flow path is not increased so high (i.e., even when pressure is not reduced so much). Thus, pump power required for the evaporation promotion step can be reduced. Although a heating source for heating the heat exchanger is required, the heating source is not used for directly heating and evaporating the liquid remaining in the flow paths, but is used for heating the decompressed flow paths. Thus, this method enables suppressing an increase in temperature of the heat exchanger as compared with a method for directly heating and evaporating the liquid, so that an increase in cost can be suppressed.

(5) The method for checking quality may further include a step of checking whether no liquid remains in the first flow path and the second flow path. This aspect enables a user of the heat exchanger to be guaranteed that no liquid remains in the first flow path and the second flow path.

(6) The heat exchanger may be a heat exchanger of a stacked type.

As described above, a quality check of a heat exchanger can be performed without using a large amount of hot air.

This application is based on Japanese Patent Application No. 2022-126609 filed on Aug. 8, 2022, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A method for checking quality of a heat exchanger comprising:

performing a liquid pressure test for the heat exchanger including a first flow path and a second flow path adjacent to the first flow path by filling the first flow path and the second flow path with a liquid in a pressurized state;

discharging the liquid from the first flow path and the second flow path; and promoting evaporation of the liquid remaining in the first flow path and the second flow path by reducing pressure inside each of the first flow path and the second flow path using a vacuum pump;

wherein the promoting evaporation of the liquid includes a first step of reducing pressure inside the first flow path and at the same time feeding heated gas into the second flow path, and a second step of reducing pressure inside the second flow path and at the same time feeding heated gas into the first flow path, wherein the second step is performed before or after the first step.

2. The method for checking quality of a heat exchanger according to claim 1, wherein the first step is ended on condition that a decrease in pressure to a predetermined pressure or less in the first flow path is detected, and the second step is ended on condition that a decrease in pressure to a predetermined pressure or less in the second flow path is detected.

3. The method for checking quality of a heat exchanger according to claim 1, wherein the heat exchanger is heated when evaporation of the liquid is promoted.

4. The method for checking quality of a heat exchanger according to claim 1, wherein the heat exchanger is a heat exchanger of a stacked type.

5. A method for checking quality of a heat exchanger comprising:

performing a liquid pressure test for the heat exchanger including a first flow path and a second flow path adjacent to the first flow path by filling the first flow path and the second flow path with a liquid in a pressurized state;

discharging the liquid from the first flow path and the second flow path;

promoting evaporation of the liquid remaining in the first flow path and the second flow path by reducing pressure inside each of the first flow path and the second flow path using a vacuum pump; and checking to determine whether liquid remains in the first flow path and the second flow path by filling each of the first and second flow paths with a gas having a reference dew point below a predetermined value, causing the gas to flow out of each of the first and second flow paths, and comparing a dew point of the gas flowing out to the reference dew point.

6. A method for checking quality of a heat exchanger comprising:

performing a liquid pressure test for the heat exchanger including a first flow path and a second flow path adjacent to the first flow path by filling the first flow path and the second flow path with a liquid in a pressurized state;

discharging the liquid from the first flow path and the second flow path; and promoting evaporation of the liquid remaining in the first flow path and the second flow path by reducing pressure inside each of the first flow path and the second flow path using a vacuum pump;

wherein the promoting evaporation of the liquid includes a first step of reducing pressure inside the first flow path and at the same time heating the heat exchanger, and a second step of reducing pressure inside the second flow path and at the same time heating the heat exchanger, and wherein the second step is performed before or after the first step.

* * * * *